United States Patent
Yang et al.

(10) Patent No.: US 9,173,108 B2
(45) Date of Patent: Oct. 27, 2015

(54) PARALLEL INTER-RADIO ACCESS TECHNOLOGY (IRAT) MEASUREMENT IN A COMMUNICATION SYSTEM

(71) Applicant: QUALCOMM Incorporated, San Diego, CA (US)

(72) Inventors: Ming Yang, San Diego, CA (US); Tom Chin, San Diego, CA (US); Qingxin Chen, Del Mar, CA (US); Guangming Shi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 313 days.

(21) Appl. No.: 13/755,303

(22) Filed: Jan. 31, 2013

(65) Prior Publication Data
US 2014/0213245 A1    Jul. 31, 2014

(51) Int. Cl.
*H04M 1/00* (2006.01)
*H04W 4/00* (2009.01)
*H04W 40/00* (2009.01)
*H04W 24/00* (2009.01)
*H04W 36/00* (2009.01)
*H04W 24/10* (2009.01)
*H04W 36/14* (2009.01)

(52) U.S. Cl.
CPC .......... *H04W 24/00* (2013.01); *H04W 36/0088* (2013.01); *H04W 24/10* (2013.01); *H04W 36/14* (2013.01)

(58) Field of Classification Search
CPC .. H04W 24/10; H04W 36/0061; H04W 88/06
USPC .................. 455/552.1, 422.1, 448
See application file for complete search history.

(56) References Cited

U.S. PATENT DOCUMENTS

| | | | |
|---|---|---|---|
| 7,444,150 | B2 | 10/2008 | Rick et al. |
| 8,107,950 | B2 | 1/2012 | Amirijoo et al. |
| 2005/0079870 | A1* | 4/2005 | Rick et al. ............ 455/437 |
| 2009/0022062 | A1 | 1/2009 | Wang et al. |
| 2009/0088160 | A1 | 4/2009 | Pani et al. |
| 2009/0291686 | A1 | 11/2009 | Alpert et al. |
| 2012/0165019 | A1 | 6/2012 | Shintani et al. |

FOREIGN PATENT DOCUMENTS

WO    2013142415    9/2013

OTHER PUBLICATIONS

"Digital cellular telecommunications system (Phase 2+); Radio transmission and reception (GSM 05.05 version 7.1.0 Release 1998)", 3GPP Standard; EN 300 910, 3rd Generation Partnership Project (3GPP), Mobile Competence Centre ; 650, Route Des Lucioles ; F-06921 Sophia-Antipolis Cedex ; France, No. V7.1.0, Jul. 1, 1999, pp. 1-67, XP050358871, p. 9, line 12.
International Search Report and Written Opinion—PCT/US2014/013224—ISA/EPO—May 13, 2014.
Taiwan Search Report—TW103103627—TIPO—May 26, 2015.

* cited by examiner

*Primary Examiner* — Omoniyi Obayanju
(74) *Attorney, Agent, or Firm* — Seyfarth Shaw LLP

(57) ABSTRACT

A UE is configured to collect multiple absolute radio frequency channel numbers (ARFCNs) in parallel via a wideband receiver during a transmission gap. Inter-radio access technology (IRAT) measurements are performed based on the collected AFRCN samples.

20 Claims, 5 Drawing Sheets

PARALLEL INTER-RADIO ACCESS TECHNOLOGY (IRAT) MEASUREMENT IN A COMMUNICATION SYSTEM

BACKGROUND

1. Field

Aspects of the present disclosure relate generally to wireless communication systems, and more particularly, to improving inter-radio access technology measurement in time division synchronous code division multiple access (TD-SCDMA) systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method of wireless communication during an inter-radio access technology (IRAT) measurement includes collecting multiple absolute radio frequency channel numbers (ARFCN) samples in parallel using a wideband receiver during a transmission gap. The method may also include performing IRAT measurements based on the collected AFRCN samples.

According to another aspect of the present disclosure, an apparatus for wireless communication during an inter-radio access technology (IRAT) measurement includes means for collecting multiple absolute radio frequency channel numbers (ARFCN) samples in parallel using a wideband receiver during a transmission gap. The apparatus may also include means for performing IRAT measurements based on the collected AFRCN samples.

According to one aspect of the present disclosure, a computer program product for wireless communication during an inter-radio access technology (IRAT) measurement includes a computer readable medium having non-transitory program code recorded thereon. The program code includes program code to collect multiple absolute radio frequency channel numbers (ARFCN) samples in parallel using a wideband receiver during a transmission gap. The program code also includes program code to perform IRAT measurements based on the collected AFRCN samples.

According to one aspect of the present disclosure, an apparatus for wireless communication during an inter-radio access technology (IRAT) measurement includes a memory and a processor(s) coupled to the memory. The processor(s) is configured to collect multiple absolute radio frequency channel numbers (ARFCN) samples in parallel using a wideband receiver during a transmission gap. The processor(s) is further configured to perform IRAT measurements based on the collected AFRCN samples.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
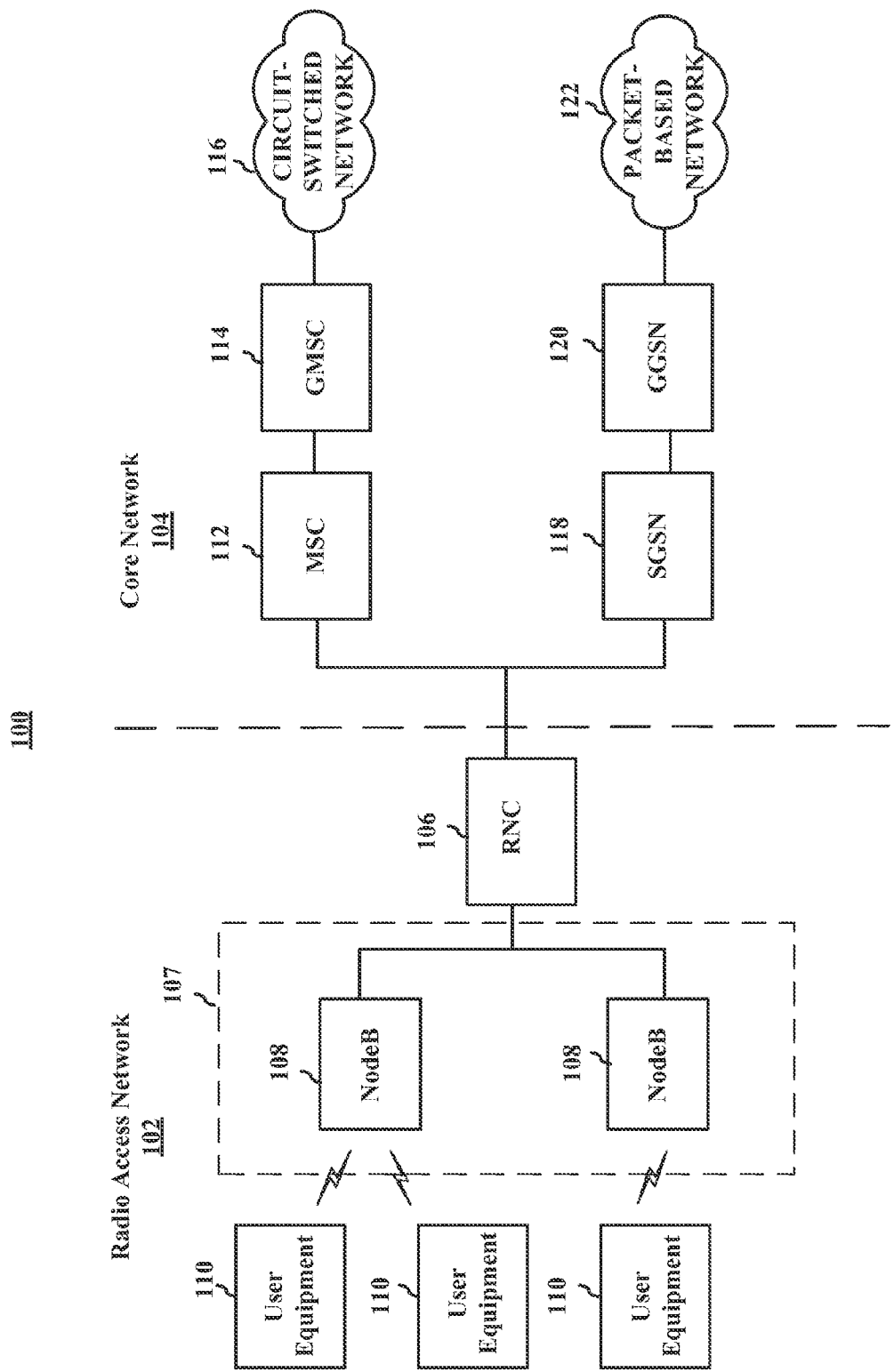
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
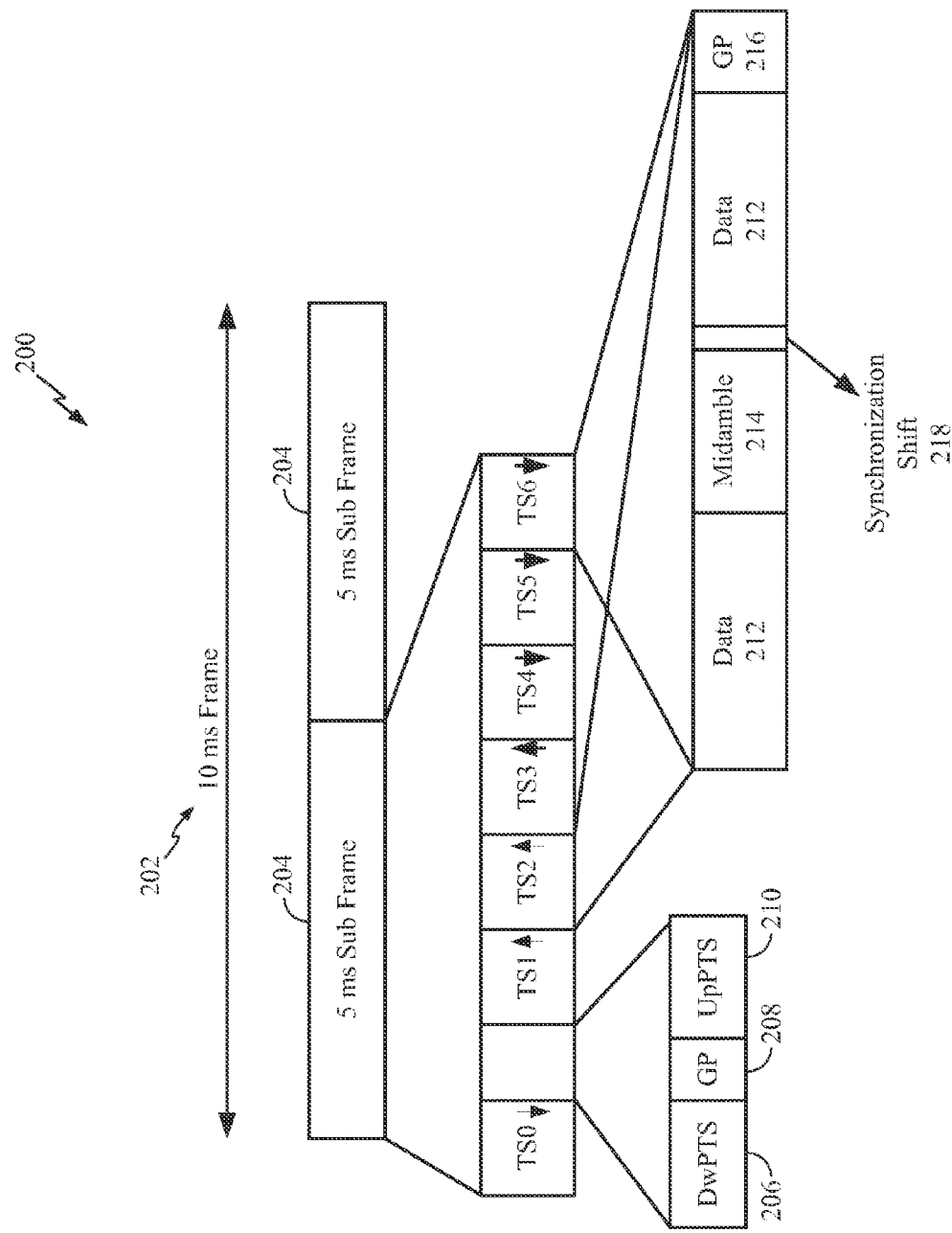
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The bandwidth of each frequency channel in the TD-SCDMA system is 1.6 MHz. The chip rate in TD-SCDMA is 1.28 Mcps. The downlink and uplink transmissions share the same bandwidth in different time slots (TSs). In each time slot, there are multiple code channels. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS 1. DwPTS is used to transmit DwPCH (Downlink Pilot Channel). Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
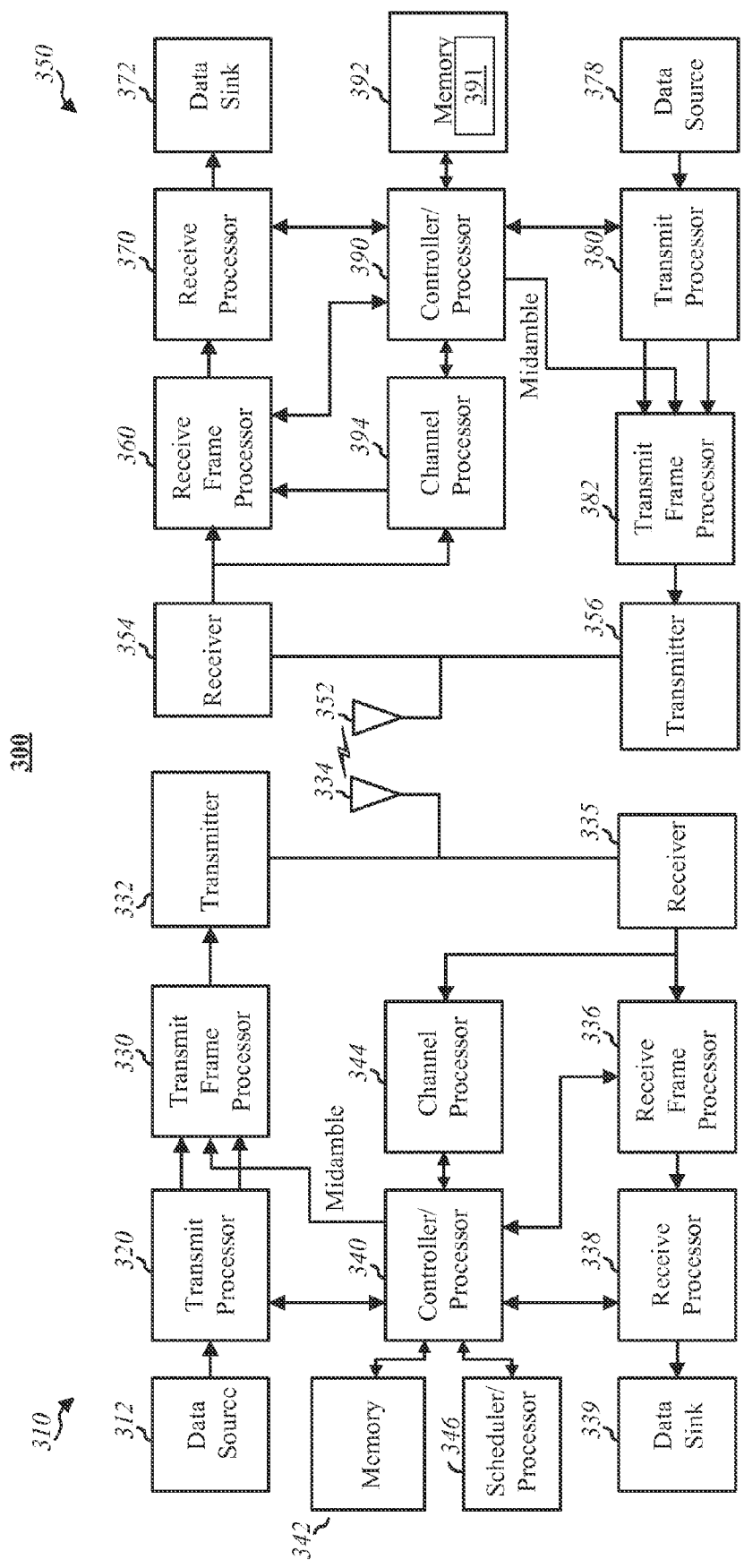
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a parallel IRAT measurement module 391 which, when executed by the controller/processor 390, configures the UE 350 as indicated below. A scheduler/processor 346 at the node B 310 may be used to allocate resources to the UEs and schedule downlink and/or uplink transmissions for the UEs.

Parallel Irat Measurement in TD-SCDMA

Figure 4:
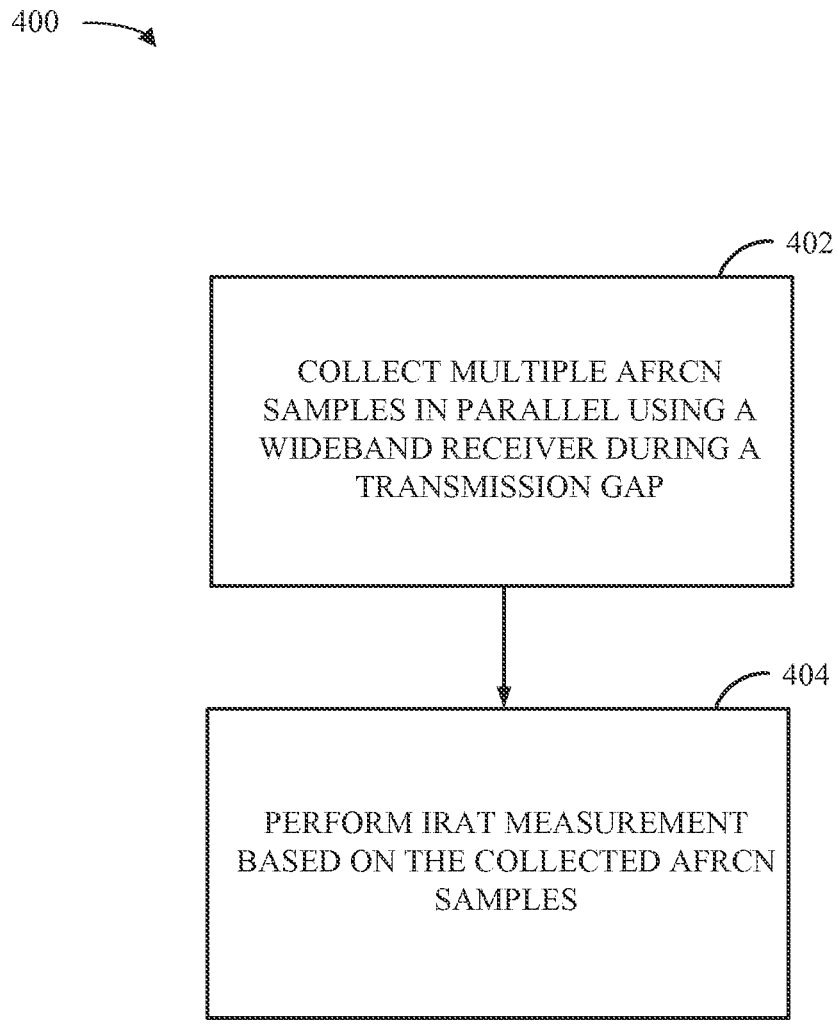
FIG. 4 is a block diagram illustrating a parallel IRAT measurement method according to one aspect of the present disclosure.

Some networks, such as a newly deployed network, may cover only a portion of a geographical area. Another network, such as an older more established network, may better cover the area, including remaining portions of the geographical area. FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The measurement of the neighboring cells may be implemented during a transmission gap corresponding to an idle time slot. During the transmission gap, a UE may tune to a new frequency of a neighbor RAT, perform IRAT measurements and tune back to the frequency of the serving RAT. In WCDMA and LTE systems where the transmission gap is large, the UE can serially tune to multiple frequencies such as absolute radio frequency channel numbers (ARFCNs) and measure the received signal strength indicator (RSSI) for multiple ARFCNs within the same transmission gap. Each channel in the GSM is identified by a specific absolute radio frequency channel identified by an ARFCN.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The serving cell signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared to a neighbor system threshold value. Before handover or cell reselection, in addition to the measurement processes, the base station identity (e.g., BSICs) may be confirmed and re-confirmed.

A radio bearer can use one or more code channels for each time slot (TS) to send data. For example, a circuit-switched (CS) 12.2 kbps radio bearer can use two (2) code channels in one uplink time slot (TS) and two (2) code channels in one downlink time slot to transmit data. For high data rate communications, multiple time slots are allocated. The other time slots (e.g., the unallocated time slots) are referred to as idle time slots. During the idle time slots, the UE can tune to another system/frequency to perform inter-radio access technology (IRAT) measurements, which may include, but are not limited to, received signal strength indicator (RSSI) measurements, frequency correction channel (FCCH) tone detection for each AFRCN sample, synchronous channel BSIC verification of each ARFCN sample, base station identity code (BSIC) confirm and BSIC reconfirm.

In TD-SCDMA, there is no compress mode and the idle time slots are used to perform IRAT measurements, such as GSM IRAT measurements. The unavailability of large transmission gaps or consecutive idle time slots in TD-SCDMA systems makes it challenging to perform IRAT measurements, especially for multi time slot packet switched (PS) calls. For example, during a transmission gap, a UE may tune to a new frequency of a neighbor RAT, perform an IRAT measurement and tune back to the frequency of the serving RAT. Due to the lack of consecutive idle time slots in TD-SCDMA systems, only a single IRAT measurement is performed during the transmission gap. The unavailability of consecutive idle time slots in TD-SCDMA systems may cause a delay in IRAT measurements. This delay in IRAT measurement may result in dropped calls and/or degraded IRAT handover performance.

One aspect of the present disclosure is directed to improving IRAT measurements by performing parallel IRAT measurement of AFRCNs within the same transmission gap of the TD-SCDMA system. In particular, in one aspect of the present disclosure, a wideband receiver (e.g., receiver 354) performs IRAT measurement in a TD-SCDMA system by tuning to multiple AFRCNs in parallel. During the single transmission gap, the wideband receiver 354 receives/collects multiple ARFCN samples (e.g., GSM or multiple RAT samples) for parallel IRAT measurement within one frequency band or across different frequency bands. The wideband receiver may have an increased bandwidth based on the capability of the UE. In one aspect, the bandwidth of the wideband receiver is 100 KHz. Each channel in GSM identified by the specific AFRCN may have a frequency band of 20 KHz.

The IRAT measurement of neighbor cells (e.g., GSM neighbor cells) may be based on a frequency difference between neighbor cells. For example, the wideband receiver can be used for parallel IRAT measurement when the difference in frequency between two GSM cells is less than the bandwidth (i.e., 100 KHz, of the wideband receiver). In this aspect, the wide band receiver can perform IRAT measurements for three or four GSM cells in parallel within the single transmission gap. Thus, instead of only performing a single IRAT measurement or no IRAT measurement within the small transmission gap, the UE can utilize the increased bandwidth of the wideband receiver to tune to multiple AFRCNs concurrently and thus perform IRAT measurements of the multiple AFRCNs in parallel.

For example, the UE can turn on/off the wideband receiver adaptively based on an IRAT GSM cell's ARFCN as indicated by the network. The UE can choose multiple ARFCNs as a group and turn on the wideband receiver adaptively to perform parallel IRAT measurement using a single transmission gap. Advantageously, this technique may eliminate or reduce the need to hop through all of the AFRCNs one at a time which may result in delays in IRAT measurements due to the unavailability of large or consecutive gaps.

FIG. 4 shows a wireless communication method 400 according to one aspect of the disclosure. A UE collects multiple ARFCN samples in parallel using a wideband receiver during a transmission gap, as shown in block 402. In block 404, the UE performs IRAT measurements based on the collected AFRCN samples.

Figure 5:
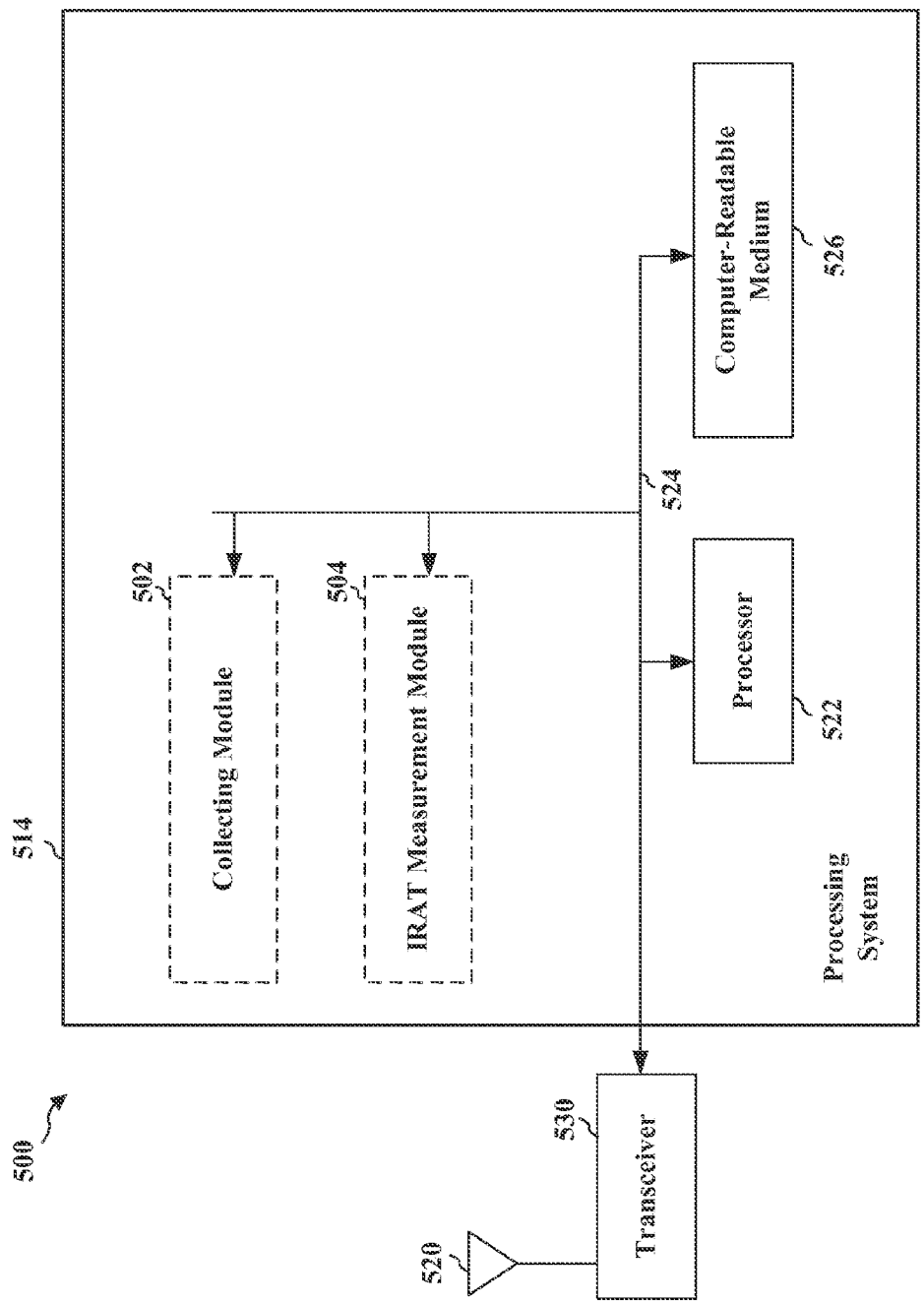
FIG. 5 is a diagram illustrating an example of a hardware implementation for an apparatus employing a processing system according to one aspect of the present disclosure.

FIG. 5 is a diagram illustrating an example of a hardware implementation for an apparatus 500 employing a parallel IRAT measurement system 514. The parallel IRAT measurement system 514 may be implemented with a bus architecture, represented generally by the bus 524. The bus 524 may include any number of interconnecting buses and bridges depending on the specific application of the parallel IRAT measurement system 514 and the overall design constraints. The bus 524 links together various circuits including one or more processors and/or hardware modules, represented by the processor 522, a collecting module 502, an IRAT measurement module 504 and the computer-readable medium 526. The bus 524 may also link various other circuits such as timing sources, peripherals, voltage regulators, and power management circuits, which are well known in the art, and therefore, will not be described any further.

The apparatus includes the parallel IRAT measurement system 514 coupled to a transceiver 530. The transceiver 530 is coupled to one or more antennas 520. The transceiver 530 enables communicating with various other apparatus over a transmission medium. The parallel IRAT measurement system 514 includes a processor 522 coupled to a computer-readable medium 526. The processor 522 is responsible for general processing, including the execution of software stored on the computer-readable medium 526. The software, when executed by the processor 522, causes the parallel IRAT measurement system 514 to perform the various functions described for any particular apparatus. The computer-readable medium 526 may also be used for storing data that is manipulated by the processor 522 when executing software.

The parallel IRAT measurement system 514 includes the collecting module 502 for collecting multiple ARFCN samples in parallel using a wideband receiver during a transmission gap. The parallel IRAT measurement system 514 also includes the IRAT measurement module 504 for performing IRAT measurements based on the collected AFRCN samples. The modules may be software modules running in the processor 522, resident/stored in the computer-readable medium 526, one or more hardware modules coupled to the processor 522, or some combination thereof. The parallel IRAT measurement system 514 may be a component of the UE and may include the memory 392, and/or the controller/processor 390.

In one configuration, an apparatus such as a UE is configured for wireless communication including means for collecting multiple ARFCN samples in parallel using a wideband receiver during a transmission gap. In one aspect, the collecting means may be the receiver 354, transceiver 530, receive frame processor 360, receive processor 370, channel processor 394, controller/processor 390, the memory 392, the parallel IRAT measurement module 391, collecting module 502 and/or the parallel IRAT measurement system 514 configured to perform the functions recited by the aforementioned means. In another aspect, the aforementioned means may be a module or any apparatus configured to perform the functions recited by the aforementioned means.

In one configuration, an apparatus such as a UE is configured for wireless communication including means for performing IRAT measurements based on the collected AFRCN samples. In one aspect, the IRAT measurement performing means may be the channel processor 394, controller/processor 390, the memory 392, the parallel IRAT measurement module 391, IRAT measurement module 504 and/or the parallel IRAT measurement system 514 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication during an inter-radio access technology (IRAT) measurement, comprising:
    collecting multiple absolute radio frequency channel numbers (ARFCN) samples in parallel using a wideband receiver during a transmission gap; and
    performing IRAT measurements of the multiple AFRCN samples using the wideband receiver based on the collected AFRCN samples when a difference in frequency between two cells is less than a bandwidth of the wideband receiver.

2. The method of claim 1, further comprising adaptively enabling the wideband receiver based on a frequency difference between the ARFCNs in at least one neighbor cell.

3. The method of claim 2, in which the at least one neighbor cell comprises a global system for mobile (GSM) communications cell.

4. The method of claim 1, in which performing the IRAT measurements comprises measuring a received signal strength indication (RSSI) of each ARFCN sample.

5. The method of claim 1, in which performing the IRAT measurements comprises a frequency correction channel (FCCH) tone detection of each ARFCN sample.

6. The method of claim 1, in which performing the IRAT measurements comprises synchronous channel (SCH) base station identity code (BSIC) verification of each ARFCN sample.

7. The method of claim 1, in which the wideband receiver collects multiple global system for mobile (GSM) ARFCN samples within one frequency band or across different frequency bands.

8. The method of claim 1, in which the wideband receiver extends to collect multiple RAT (radio access technology) samples within one frequency band or across different frequency bands.

9. An apparatus for wireless communication during an inter-radio access technology (IRAT) measurement, comprising:
    means for collecting multiple absolute radio frequency channel numbers (ARFCN) samples in parallel using a wideband receiver during a transmission gap; and
    means for performing IRAT measurements of the multiple AFRCN samples using the wideband receiver based on the collected AFRCN samples when a difference in frequency between two cells is less than a bandwidth of the wideband receiver.

10. The apparatus of claim 9, further comprising means for adaptively enabling the wideband receiver based on a frequency difference between the ARFCNs in at least one neighbor cell.

11. The apparatus of claim 10, in which the at least one neighbor cell comprises a global system for mobile (GSM) communications cell.

12. An apparatus for wireless communication during an inter-radio access technology (IRAT) measurement, comprising:
    a memory; and
    at least one processor coupled to the memory and configured:
        to collect multiple absolute radio frequency channel numbers (ARFCN) samples in parallel using a wideband receiver during a transmission gap; and
        to perform IRAT measurements of the multiple AFRCN samples using the wideband receiver based on the collected AFRCN samples when a difference in frequency between two cells is less than a bandwidth of the wideband receiver.

13. The apparatus of claim 12, in which the at least one processor is further configured to adaptively enable the wideband receiver based on a frequency difference between the ARFCNs in at least one neighbor cell.

14. The apparatus of claim 13, in which the at least one neighbor cell comprises a global system for mobile (GSM) communications cell.

15. The apparatus of claim 12, in which the at least one processor is further configured to perform the IRAT measurements by measuring a received signal strength indication (RSSI) of each ARFCN sample.

16. The apparatus of claim 12, in which the at least one processor is further configured to perform the IRAT measurements by detecting a frequency correction channel (FCCH) tone of each ARFCN sample.

17. The apparatus of claim 12, in which the at least one processor is further configured to perform the IRAT measurements by verifying synchronous channel (SCH) base station identity code (B SIC) of each ARFCN sample.

18. The apparatus of claim 12, in which the wideband receiver collects multiple global system for mobile (GSM) ARFCN samples within one frequency band or across different frequency bands.

19. The apparatus of claim 12, in which the wideband receiver extends to collect multiple RAT (radio access technology) samples within one frequency band or across different frequency bands.

20. A computer program product for wireless communication during an inter-radio access technology (IRAT) measurement, comprising:
- a non-transitory computer-readable medium having non-transitory program code recorded thereon, the program code comprising
    - program code to collect multiple absolute radio frequency channel numbers (ARFCN) samples in parallel using a wideband receiver during a transmission gap; and
    - program code to perform IRAT measurements of the multiple AFRCN samples using the wideband receiver based on the collected AFRCN samples when a difference in frequency between two cells is less than a bandwidth of the wideband receiver.

* * * * *